United States Patent
Anschutz et al.

(10) Patent No.: US 9,002,753 B2
(45) Date of Patent: Apr. 7, 2015

(54) METHOD AND APPARATUS FOR PROVIDING A PERSONAL VALUE FOR AN INDIVIDUAL

(75) Inventors: Thomas Anschutz, Conyers, GA (US); James Carlton Bedingfield, Sr., Gainesville, GA (US); Robert Edwards, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 245 days.

(21) Appl. No.: 13/328,724

(22) Filed: Dec. 16, 2011

(65) Prior Publication Data

US 2012/0089618 A1    Apr. 12, 2012

(51) Int. Cl.
G06Q 99/00    (2006.01)
G06Q 40/02    (2012.01)

(52) U.S. Cl.
CPC .................................. *G06Q 40/025* (2013.01)

(58) Field of Classification Search
CPC .............. G06Q 30/0269; G06Q 50/01; G06F 17/30702
See application file for complete search history.

(56) References Cited

U.S. PATENT DOCUMENTS

| | | | |
|---|---|---|---|
| 7,716,140 B1* | 5/2010 | Nielsen et al. | 705/319 |
| 8,438,062 B2* | 5/2013 | Rohan et al. | 705/14.66 |
| 8,478,697 B2* | 7/2013 | Agarwal | 705/319 |
| 2005/0159998 A1* | 7/2005 | Buyukkokten et al. | 705/11 |
| 2007/0198510 A1* | 8/2007 | Ebanks | 707/5 |
| 2008/0120411 A1* | 5/2008 | Eberle | 709/225 |
| 2008/0140506 A1* | 6/2008 | Christianson et al. | 705/10 |
| 2008/0294624 A1* | 11/2008 | Kanigsberg et al. | 707/5 |
| 2009/0024546 A1* | 1/2009 | Ficcaglia et al. | 706/12 |
| 2009/0177538 A1* | 7/2009 | Brewer et al. | 705/14 |
| 2009/0271209 A1* | 10/2009 | Krishnamurthy et al. | 705/1 |
| 2009/0276233 A1* | 11/2009 | Brimhall et al. | 705/1 |
| 2009/0327484 A1* | 12/2009 | Chen et al. | 709/224 |
| 2010/0228631 A1* | 9/2010 | Zhang et al. | 705/14.66 |
| 2010/0268655 A1* | 10/2010 | Cheuoua | 705/319 |
| 2010/0313009 A1* | 12/2010 | Combet et al. | 713/150 |
| 2011/0022602 A1* | 1/2011 | Luo et al. | 707/748 |
| 2011/0112916 A1* | 5/2011 | Baluja et al. | 705/14.73 |
| 2011/0112957 A1* | 5/2011 | Ingram et al. | 705/38 |
| 2011/0208592 A1* | 8/2011 | Golder | 705/14.66 |
| 2011/0208749 A1* | 8/2011 | Guo et al. | 707/748 |
| 2011/0264522 A1* | 10/2011 | Chan et al. | 705/14.52 |
| 2011/0288939 A1* | 11/2011 | Elvekrog et al. | 705/14.67 |
| 2011/0296004 A1* | 12/2011 | Swahar | 709/224 |
| 2012/0036127 A1* | 2/2012 | Work et al. | 707/732 |
| 2012/0072384 A1* | 3/2012 | Schreiner et al. | 706/45 |
| 2012/0254320 A1* | 10/2012 | Dove et al. | 709/206 |

* cited by examiner

*Primary Examiner* — Daniel Kinsaul

(57) ABSTRACT

A method and apparatus for generating a personal value for a user are disclosed. For example, the method collects data associated with the user, wherein the data that is collected comprises social connection data, enhances the data that is collected, receives a request, and generates a response to the request by using a personal value for the user, where the personal value is generated from the data that is enhanced.

15 Claims, 3 Drawing Sheets

METHOD AND APPARATUS FOR PROVIDING A PERSONAL VALUE FOR AN INDIVIDUAL

The present disclosure relates generally to communication networks and, more particularly, to methods, computer-readable media and devices for generating and utilizing one or more personal values for an individual.

BACKGROUND

Personal information for an individual can be readily obtained or voluntarily provided by the individual. For example, the individual may provide information such as a current salary, a financial report pertaining to the individual's assets, e.g., real estate holdings, financial statements from financial institutions, tax returns, and the like. Although the above information can be used to provide a rating of the individual, e.g., a credit score, the above information does not provide a true measure of the individual's overall value.

SUMMARY

In one embodiment, the present disclosure discloses a method for generating a personal value for a user. For example, the method collects data associated with the user, wherein the data that is collected comprises social connection data, enhances the data that is collected, receives a request, and generates a response to the request by using a personal value for the user, where the personal value is generated from the data that is enhanced.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
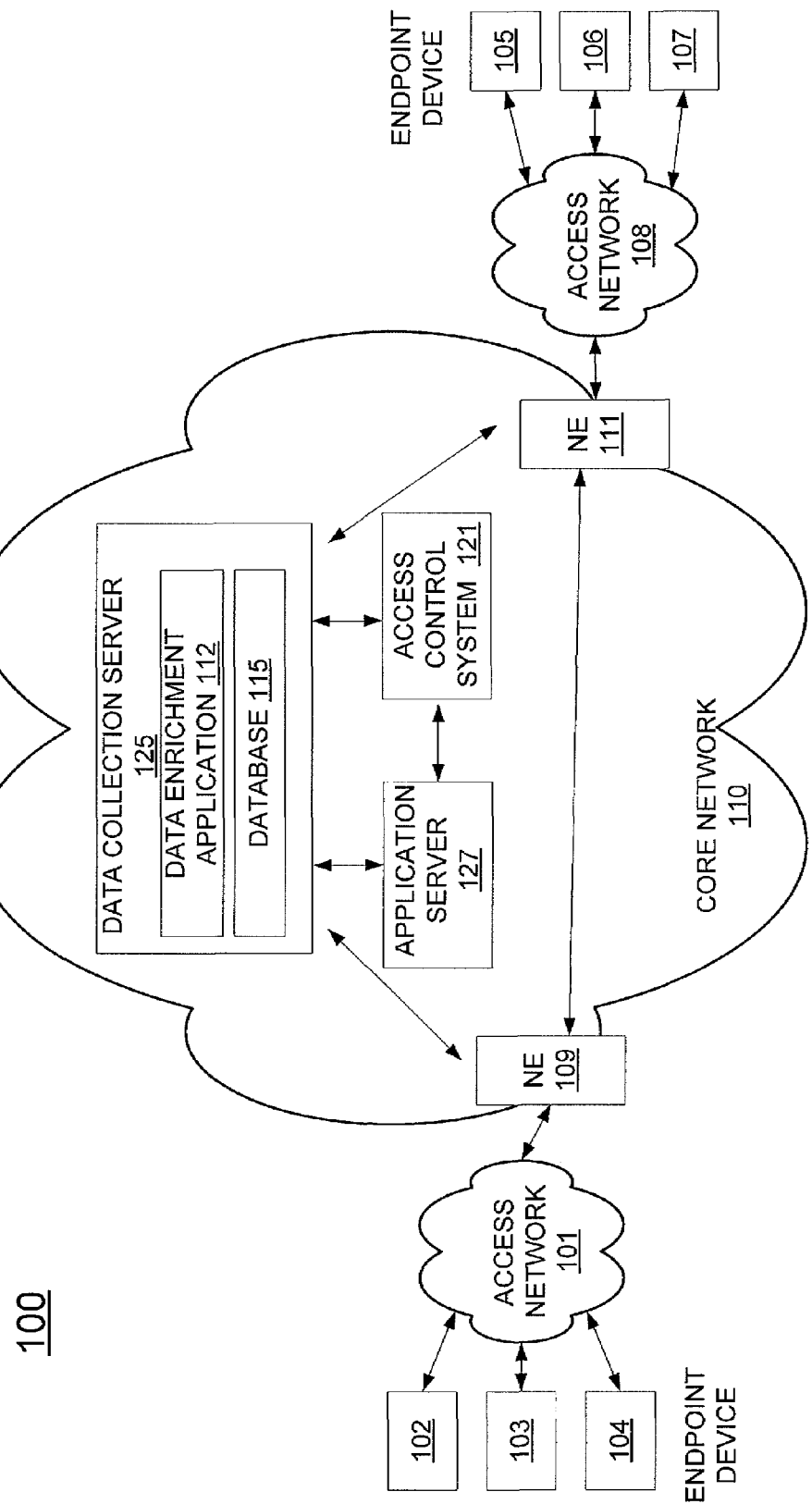
FIG. 1 illustrates an exemplary network related to the present disclosure.

The present disclosure broadly discloses methods and computer-readable media for generating and utilizing a personal value for an individual. Although the present disclosure may describe embodiments in the context of particular networks, systems and environments, the present disclosure is not so limited. Namely, the present disclosure can be applied to any type of computer-enhanced communication network that is capable of supporting communications between devices.

In various embodiments, the present disclosure provides a network-based service that generates and utilizes one or more personal values for an individual. For instance, embodiments of the present disclosure may be deployed in, or provided by, an application server as a service. In one embodiment, the service accesses and aggregates user information including, inter alia, self-identified data, self-generated data, social connection data, societal connection data, financial data, consumer data, and third party feedback data.

Once the data has been gathered and "enhanced", an individual's cumulative value or personal value is generated and stored. It should be noted that although the present disclosure discusses the generation of a personal value for an individual, the present disclosure is not so limited. As will be discussed further below, one or more personal values can be generated for each individual. This individual's personal value can be perceived as a common stock portfolio that fluctuates based on the attributes, parameters, or market needs that serve as the basis for computing the individual's personal value. In one embodiment, the personal value is implemented as a "vector" with multi-dimensional components that sum into an overall value and direction in n-space. However, it should be noted that the present disclosure may use only one or more subsets of the overall vector depending on the criteria of a particular application as discussed further below.

Thus, changes to the attributes or parameters of the individual will cause a corresponding change to the individual's personal value, e.g., receiving a promotion at work may elevate the individual's personal value, whereas losing a job may lower the individual's personal value. A detailed description as to the generation and utilization of the individual's personal value will be described below.

In one embodiment, the individual's personal value (including the underlying parameters or attributes that were used to generate the personal value) can be centrally stored, e.g., in a database. For example, an application server may obtain the individual's personal value from e.g., a web-based application server. It should be noted that the present disclosure is not limited by the hardware devices or the location of the hardware devices that are used to store the individual's personal value, i.e., a web-based application server is only an illustrative example.

In one embodiment, the service may access the individual's personal value to provide an event opportunity. For example, a third party vendor may be interested in marketing a product or a service to various individuals. However, the product or the service may be deemed to be appropriate only for individuals with personal values greater than a predefined value. For example, a power boat vendor may want to market a new power boat to consumers. However, given that only a small portion of the population will be interested or even qualified to purchase a power boat, the third party vendor may utilize an individual's personal value to determine whether marketing effort should be directed to a particular individual. It should be noted that since an individual's private information is very sensitive and quite personal to the individual, the access by any third party vendor will be subjected to various limitations that will be discussed further below.

In another example, the product or the service may be deemed to be appropriate only for individuals with personal values lower than a predefined value. For example, a discount store (e.g., a discount store where all items in the store are priced less than $1.99) may be interested in opening a new store at a new location and may select a location where there is a high concentration of individuals where their personal values may indicate that they are more spendthrift.

The above two examples provide a quick view of the utilization of the individual's personal value based predominately on financial strength of the individuals. However, the utilization of the individual's personal value of the present disclosure is not so limited. For example, if a third party vendor wants to organize a fund raiser at a location for a particular cause, e.g., for supporting cancer awareness, for supporting a political candidate, for supporting an animal shelter, for supporting a particular educational institutional, e.g., a college or a university, and so on, then an individual's personal value based predominately on financial strength alone may not always provide a proper match. For example, organizing a fund raiser for a particular political candidate based solely on a high personal value of individuals in a particular location based predominately on financial strength may still produce a poor result without knowing the political affiliations of those individuals. Similarly, organizing a fund raiser for a particular college at a location where there are very few alumni from that college may still produce a poor result even though many individuals at that location have high personal values.

Thus, the personal value of an individual of the present disclosure is not based alone on financial data. In fact, as will be discussed further below, the personal value is generated in view of one or more of self-identified data, self-generated data, social connection data, societal connection data, financial data, consumer data, and third party feedback data. The present approach provides a more accurate assessment of the true value of an individual. In fact, in one embodiment, the personal value may dynamically change based on the purpose of a request in which the personal value will be used. For example, the personal value for an individual for the purpose of buying a power boat may have a score of "1000", whereas the personal value for the same individual for the purpose of supporting a Republican candidate at a political fund raiser may have a score of "200" (e.g., because the individual is a registered Democrat).

To better understand the present disclosure, FIG. 1 illustrates an example network 100, e.g., an Internet Protocol (IP) network related to the present disclosure. An IP network is broadly defined as a network that uses Internet Protocol to exchange data packets. Exemplary IP networks include networks such as Voice over Internet Protocol (VoIP) networks, IP Multimedia Subsystem (IMS) networks, Service over Internet Protocol (SoIP) networks, and the like.

In one embodiment, the network 100 may comprise a plurality of endpoint devices 102-104 configured to provide data or request to a data collection server 125 through the core network 110 or Internet (e.g., an IP based network supported by a service provider) via an access network 101. Similarly, a plurality of endpoint devices 105-107 are configured for communication with data collection server 125 through the core network 110 via an ISP using an access network 108. The network elements (NEs) 109 and 111 may serve as gateway servers or edge routers for the network 110.

The endpoint devices 102-107 may comprise user endpoint devices such as personal computers, servers, laptop computers, Personal Digital Assistants (PDAs), mobile phones, cellular phones, smart phones, computing tablets, email devices, messaging devices, home automation devices, machine-to-machine instruments and the like. For example, each of the endpoint devices may comprise a subscriber's mobile endpoint device or a vendor/third-party's endpoint device (e.g., a point-of-sale (POS) terminal, a third party server, or a computer, or a home security system), as will be described in greater detail below. The access networks 101 and 108 serve as a conduit to establish a connection between the endpoint devices 102-107 and the Network Elements (NEs) 109 and 111 of the core network 110 or Internet. The access networks 101 and 108 may each comprise a Digital Subscriber Line (DSL) network, a broadband cable access network, a Local Area Network (LAN), a cellular network, a Wi-Fi network, a $3^{rd}$ party network, and the like. The access networks 101 and 108 may be either directly connected to NEs 109 and 111 of the IMS core network 110, or indirectly through another network.

In one embodiment, the core network 110 may also comprise a Data Collection Server 125, a Data Enrichment Application 112, an unstructured database 115, a security, permissions, and information access control system 121 (broadly an access control system), and an Application server 127.

In one embodiment, the access control system 121 broadly determines whether various requests to obtain data (e.g., accessing an individual's personal value) will be allowed, e.g., the requestor may have to undergo an authentication process, and the like. Furthermore, access control system 121 may also have the necessary access information to verify various attributes that are associated with an individual, e.g., account information, user names, access codes, and the like. Broadly, access control system 121 is used to ensure that personal information would not be easily obtained without proper authentication or approval provided by an individual, either previously defined, e.g., via a user profile, or on a per request basis, e.g., receiving a direct approval from the individual.

The application server 127 may comprise any server or computer that is well known in the art, and the database 115 may be any type of electronic collection of data that is also well known in the art and may be generally preferred to be embodied using unstructured data and schema-less design (e.g. MongoDB). In one embodiment, the application server 127 may be configured to generate and utilize a personal value for an individual. Accordingly, in one embodiment the database 115 may store a list of individuals (e.g., registered users of a service provider such as subscribers to a cellular service and the like) and their corresponding personal values and enable the arrangement of event opportunities between the list of individuals and third party vendors, as discussed in greater detail below.

The above IP network is only described to provide an illustrative environment in which data is transmitted, stored, and/or processed in networks. It should be noted that the communication network 100 may be expanded by including additional endpoint devices, access networks, network elements, application servers, etc. without altering the scope of the present disclosure.

Figure 2:
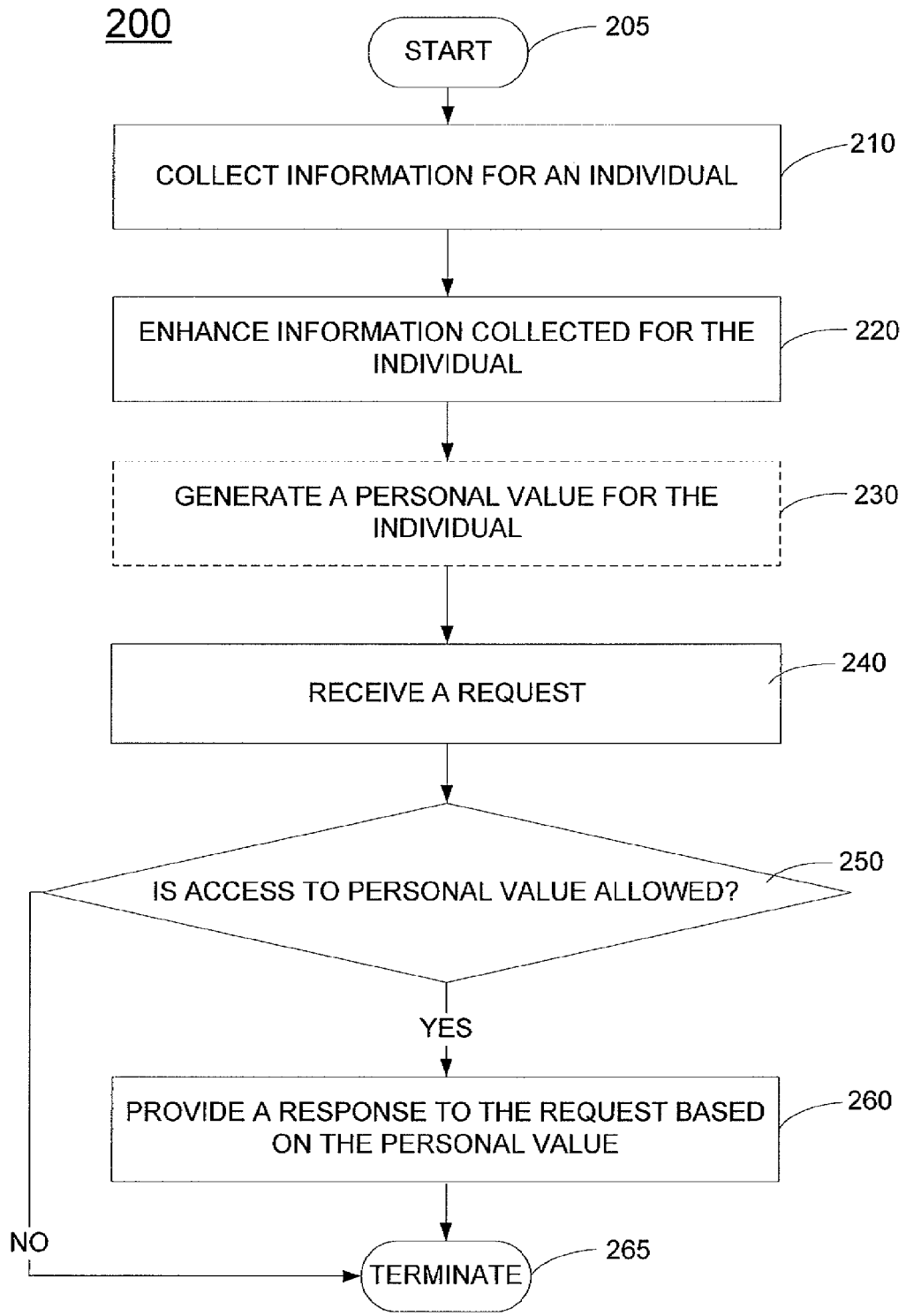
FIG. 2 illustrates a flowchart of a method for generating and utilizing a personal value for an individual.

FIG. 2 illustrates a flowchart of a method 200 for generating and utilizing a personal value for an individual. In one embodiment, one or more steps of the method 200 can be performed by one or more of the components of the core network 110 and/or similar elements if they were to be added to the access networks 101 and 108, which may comprise wireless or wireline access networks. For example, in one embodiment one or more steps of the method 200 can be implemented by an application server such as 127. In addition, one or more steps of the method 200 may be implemented by a general purpose computer having a hardware processor, a memory and input/output devices as illustrated below in FIG. 3, where the general purpose computer serves as an illustrative physical architecture for the application servers or computing systems as discussed in the present disclosure.

The method begins in step 205 and proceeds to step 210. At step 210, the method 200 collects information for an individual. For example, one or more self-identified data, self-generated data, social connection data, societal connection data, financial data, consumer data, and third party feedback data are collected for each individual.

In one embodiment, self-identified data comprises user preferences, user perception data, and the like. Broadly, self-identified data comprises any information that is dictated and specified by the user based solely at the judgment or personal opinion of the user. For example, the user may specify that he or she likes a particular type of food, a particular restaurant, a particular area of town, a particular brand of clothing, a particular place to vacation, a particular trait in a person that he or she finds attractive, a particular trait in a person that he or she finds unattractive, a favorite sport, a favorite professional sports team, a favorite college team, a favorite color, a favorite celebrity, a favorite show, and so on. The above list is only illustrative and should not be interpreted as a limitation of the present disclosure. In sum, self-identified data broadly comprises the user's preferences or opinions.

In one embodiment, self-generated data comprises any information that is generated or caused by the user that can be factually verified. For example, self-generated data may comprise the user's address (e.g., as verified by a utility bill), the user's official job title, the user's employer (e.g., as verified by a W-2 form), the current physical location of the user (e.g., as verified by a GPS signal from a user device, e.g., the user's cell phone), the user's health information (e.g., as verified by medical records), the user's daily schedule (e.g., as verified by the user's electronic calendar), the user's driving records, (e.g., as verified by the department of motor vehicle for a particular state), the type and make of a vehicle owned and/or driven by the user, (e.g., as verified by the user's car title and vehicle registration), the educational degrees obtained by the user (e.g., as verified by a college transcript), the professional associations of the user (e.g., as verified by membership to a professional organization for engineers, teachers, doctors, nurses, lawyers, etc.), the type of pets owned by the user (e.g., as verified by an animal license), the user's travel records (e.g., frequent flier miles, frequent reward points at a hotel chain, etc.) and so on. The above list is only illustrative and should not be interpreted as a limitation of the present disclosure. In sum, self-generated data broadly comprises data that are caused or effected by the user that can be verified or validated.

In one embodiment, social connection data comprises any information that relates to people known to the user or where the people have previously been associated with or interacted with the user. For example, social connection data may comprise family members or relatives (e.g., grandparents, parents, children, grandchildren, spouses, brothers, sisters, uncles, aunts, nieces, nephews, in-laws, and so on), friends, colleagues (e.g., from work, from professional organizations, and the like), business associates (e.g., vendors, competitors, customers, and the like), and so on. The above list is only illustrative and should not be interpreted as a limitation of the present disclosure. In sum, social connection data broadly comprises data that contains people who are "associated" with the user, e.g., broadly people who may have interacted with the user in some manner.

In one embodiment, societal connection data comprises any information that relates the user to one or more "societies". For example, societal connection data may comprise associating the user to a society based on a user's present or former address or a location (e.g., as a "Southerner" as verified by the user address being in the southern United States, a "New Yorker" as verified by the user address being in New York City), based on a religion (e.g., as a Christian, a Catholic, a Protestant, a Baptist, a Muslim, a Buddhist, a Hindu, and so on), based on a political affiliation (e.g., an Independent, a Democrat, a Republican, and so on), based on a professional or trade society (e.g., a certified surgeon, a certified accountant, a certified engineer, a certified trial attorney, a certified home inspector, and so on), based on a governmental society or agency (e.g., district attorneys from the Justice Department, engineers from the Environmental Protection Agency, patent examiners from the U.S. Patent and Trademark Office, and the like), and so on. The above list is only illustrative and should not be interpreted as a limitation of the present disclosure. In sum, societal connection data broadly comprises any data that discloses the societies that the user is associated with.

In one embodiment, financial data (or business data) comprises any information that relates the user's financial position or financial influence or capability. For example, financial data may comprise the user's real estate holdings, the user's salary, the user's personal financial information (e.g., insurance policies, bank account and/or brokerage account information and associated values in those accounts), the user's credit information (e.g., credit scores, credit card accounts, loans, mortgages, student loans, home equity loans, car loans, and the like), and so on. The above list is only illustrative and should not be interpreted as a limitation of the present disclosure. In sum, financial data broadly comprises any data that discloses the financial value of the user.

In one embodiment, consumer data comprises any information that relates to the user's consumption, purchases or spending. For example, consumer data may comprise the user's shopping habits or tendencies such as stores (e.g., the physical stores that the user will shop at (e.g., department stores, supermarkets, etc.)), web sites visited by the user to make purchases (e.g., Amazon.com, etc.), types of goods (e.g., electronic, clothing, shoes, food, furniture, etc.) and services purchased by the user, the payment type (e.g., credit cards, debit card, cash, or coupons), the time that the user will shop (e.g., time of day, day of week, month of year, particular holidays, etc.), dollar amount spent (e.g., for each type of transaction, for each type of item, for each type of service, etc.), tendencies to transact at various levels (e.g., willing to make large purchases, e.g., cars, vacations, furniture, or unwilling to make large purchases), viewing or browsing behavior (e.g., the amount of time viewing items at a particular website), making donations (e.g., making charitable donations to various charities or causes), and so on. The above list is only illustrative and should not be interpreted as a limitation of the present disclosure. In sum, consumer data broadly comprises any data that discloses broadly the spending behavior of the user.

In one embodiment, third party feedback data comprises any information that relates to the feedback directed to the user. For example, third party feedback data may comprise third party feedback related to the user's professional skill (e.g., the user is a good or bad doctor, the user is a good or bad lawyer, the user is a good or bad teacher, and the like), third party feedback related to the user's popularity or reputation (e.g., the user is a popular student based on the number of user's connections to other students on a social network website), the user is a popular celebrity (e.g., an actor, a singer, a performer, an athlete) based on a number of "followers" on a social network website, and the like), third party feedback related to the user's activity on the web (e.g., the user has a good rating on an auctioning site like eBAY, the user has a good rating as a good gamer for a particular video game at a gaming site, etc.), and so on. It should be noted that third party feedback, e.g., of a professional's reputation may also be collected and aggregated from business/service review web services. The above list is only illustrative and should not be interpreted as a limitation of the present disclosure. In sum, third party feedback data broadly comprises any feedback data provided by others (not the user) relating to the user's behavior, reputation or skills.

It should be noted that the data collection step 210 of FIG. 2 is not a static one-time event. In fact, the data collection step 210 is an ongoing process, e.g., sources of various data are stored and the collected data can be updated from these identified sources on a regular basis, e.g., hourly, daily, weekly, monthly, quarterly, or yearly. In fact, new sources of data can be made known to the present method at any time, e.g., the user has a new job, the user opened a new credit card, the user relocated to another city, the user visited a new web site, the user purchased a new car, and so on.

Returning to FIG. 2, once the data is collected in step 210, the method 200 proceeds to step 220 where the collected data can be enhanced or enriched, e.g., via the data enrichment application 112. For example, as data are collected, various meta-data are also created. The date and time of creation and collection, source, purpose, location, persona, device, sensitivity, and other aspects of the data collection process are included in the metadata and can help characterize the validity or veracity of the collected data. For example, some data may need to be verified, e.g., via an automated process. Specifically, analytics can help with automated verification (e.g., statistical veracity) and can also derive new data from inputs and measurements. Analytics can include correlation, corroboration, and trending. For example, a user's address can be verified through a utility service subscribed by the user. In another example, a user's educational qualification can be verified with the university attended by the user, and so on. Thus, the collected data (e.g., self-generated data, social connection data, societal connection data, financial data, consumer data, and third party feedback data) can be enhanced in one embodiment, through verification or validation of the collected data through an independent authoritative source. However, it should be noted that not all collected data requires verification or validation, e.g., self-identified data need not be verified or validated.

Furthermore, enhancement of the collected data may involve the creation of additional data, e.g., correlation of various collected data to deduce additional data. For example, if the user is noted to have attended numerous sports events at a particular sports stadium, then the method may deduce that the user is a sports fan of a local sports team that is affiliated with that particular stadium. In another example, if the user has contributed consistently to political candidates of a particular party, then the method may deduce that the user favors that particular political party. Thus, method 200 may not only verify the collected data in step 220, but may automatically generate various inferences that can further supplement the data that has been collected for a particular user. Thus, method 200 may enhance the collected data by verifying the collected data and/or generating new data through correlations of the collected data.

In one embodiment, the data enhancement step will keep track of the source data used to derive new data components, and there will be a security mechanism that tracks inheritance of sensitive information so that such data is not revealed or leaked through derivative forms. For example, the financial and medical data of the user should not be disclosed, i.e., a request for individuals with yearly incomes of $200,000 should not result in a list of individuals who have yearly incomes of $200,000.

However, aggregates and other forms of derived sensitive data may become non-sensitive through the enrichment process. For example, a request for individuals with yearly incomes of $200,000 may result in an automated response that identifies a geographic location where within 50 miles of this identified location, there are 10 individuals with yearly incomes of $200,000, or 2% of the households within 50 miles of this identified location does meet the requested requirement. In this fashion, in one embodiment sensitive information will not be provided and the data enhancement step serves as a mechanism to desensitize the collected data.

In one embodiment, the system may automate the generation of security vectors. The notion of a "security vector" is that the system should be able to differentiate different levels of security among its users. For example, a personal calendar may be considered off-limits to the general public, but may be accessible to users identified as family members. Specific appointments may be shared with business partners, and free-busy time may be provided to a broader set of users. This fine-grained and pointed security vector approach enables a high level of trust in the present method, thereby encouraging the willingness of the user to share personal data. In addition to the security aspect, the present disclosure does provide the ability to auto-accept access to value information of an individual based on preferences. In other words, there is a balance between protecting an individual's personal information, while also providing sufficient access to the value information of an individual so that the individual may benefit from such access.

In step 230, method 200 generates a personal value for the user, e.g., a score from 1-100, 1-1000, or any other ranges of numbers. It should be noted that step 230 can be an optional step at this point. In other words, the method 200 may not generate a personal value at this point, but only store the collected and enhanced data. In fact, the personal value can be generated after step 250 as discussed further below after a request is received. Thus, in one embodiment, the personal value is dynamically generated, i.e., generated on demand from the stored data. Thus, the generated personal value is not a static indicator of the individual's personal value. In other words, the personal value may change based on specific request parameters or target query as discussed below.

For example, the above example provided a list of broad data types that can be considered, e.g., 1) self-identified data, 2) self-generated data, 3) social connection data, 4) societal connection data, 5) financial data, 6) consumer data, and 7) third party feedback data. These data types can be viewed as attributes that contribute to the personal value of the user. For example, a default value (or a range of values) can be assigned to each attribute. To illustrate, one approach may have a personal value (PV) that ranges from a score of 1-1000, where:

$$PV = \text{self-identified data value} +$$
$$\text{self-generated data value} + \text{social connection data value} +$$
$$\text{societal connection data value} + (z^* \text{ financial data value}) +$$
$$\text{consumer data value} + \text{third party feedback data value}.$$

In this illustrative example, each of the self-identified data value, the self-generated data value, the social connection data value, the societal connection data value, the financial data value, the consumer data value, and the third party feedback data value, may have a maximum value of 100, thereby resulting at a maximum score of 700. In this illustrative example, the financial data value has a weight or multiplier "z" (e.g., set at a value of 4), that will weigh the financial data value four times more than any other attributes resulting in a maximum score of 1000 (i.e., 100 points for each of the attributes, with the exception that 400 points are assigned to the financial data attribute). It should be noted that a weight or multiplier can be applied to any of the above attributes and the above example is only an illustration.

It should be noted that each of the attributes may have sub-attributes. To illustrate, the financial data attribute may have the following sub-attributes:
1) home ownership: (10 points for owning home for more than 20 years, 5 points for owning home for more than 10 years, 0 point for not owning a home).
2) equity in home: (10 points for having more than $200,000 in home equity, 5 points for having more than $100,000 in home equity, 0 point for having less than $5,000 in home equity).
3) salary range: (10 points for having a salary greater than $200,000, 5 points for having a salary greater than $100,000, 0 point for having a salary less than $30,000).
4) stock ownership: (10 points for having more than $200,000 in stock, 5 points for having more than $100,000 in stock, 0 point for having less than $5,000 in stock).
5) debt or liability: (10 points for having no debt or liability, 5 points for having less than $200,000 in debt or liability, 0 point for having more than $200,000 in debt, −10 points for having more than $500,000 in debt).
6) cash in banks: (10 points for having more than $200,000 in banks, 5 points for having more than $5,000 in banks, 0 point for having less than $5,000 in banks).
7) cash in retirement account: (10 points for having more than $200,000 in retirement account, 5 points for having more than $5,000 in retirement account, 0 point for having less than $5,000 in retirement account).
8) life insurance policy: (10 points for having more than $500,000 in life insurance policy, 5 points for having more than $50,000 in life insurance policy, 0 point for having no life insurance policy).
9) equity in a personal business: (10 points for having more than $200,000 in equity in a personal business, 5 points for having more than $5,000 in equity in a personal business, 0 point for having less than $5,000 in equity in a personal business).
10) expected inheritance: (10 points for having more than $200,000 in expected inheritance, 5 points for having more than $5,000 in expected inheritance, 0 point for having less than $5,000 in expected inheritance).

To illustrate another example, the social connection data attribute may have the following sub-attributes:
1) Number of individuals known by user: (20 points for knowing at least 500 individuals, 15 points for knowing at least 300 individuals, 10 points for knowing at least 150 individuals, 5 points for knowing at least 25 individuals, 0 point for knowing less than 10 individuals).
2) Average personal score of individuals known by user: (20 points for average personal score of individuals known by user is greater than 750, 15 points for average personal score of individuals known by user is greater than 500, 10 points for average personal score of individuals known by user is greater than 150, 0 point for average personal score of individuals known by user is less than 150).
3) Average salary of individuals known by user: (20 points for average salary of individuals known by user is greater than $100,000, 15 points for average salary of individuals known by user is greater than $75,000, 10 points for average salary of individuals known by user is greater than $30,000, 0 point for average salary of individuals known by user is less than $30,000).
4) Average number of years of friendship of individuals known by user: (20 points for average number of years of friendship of individuals known by user is greater than 20 years, 15 points for average number of years of friendship of individuals known by user is greater than 15 years, 10 points for average number of years of friendship of individuals known by user is greater than 3 years, 0 point for average number of years of friendship of individuals known by user is less than 3 years).
5) Number of individuals known by user who consider the user to be a close friend or relative: (20 points for knowing at least 50 of such individuals, 15 points for knowing at least 25 of such individuals, 10 points for knowing at least 5 of such individuals, 0 point for knowing less than 5 of such individuals).

It should be noted that the above set of attributes and the associated point assignments are only illustrative for the purpose of explaining the calculation of the personal value. As such, the above examples should not be perceived as a limitation of the present disclosure.

Once the user's personal value is calculated, the personal value is stored in a database. As discussed above, this personal value can be periodically updated on a predefined schedule and/or when new data is collected for the user. It should be noted that although steps 210-230 are described for a single individual, the present disclosure is not so limited. Namely, steps 210-230 are repeated for a plurality of individuals, e.g., the individuals can be subscribers of a telecommunication service, the users can be cellular phone service subscribers, the users can be customers of particular web sites, the users can be users of a social network site, and so on.

In one embodiment, the stored personal value as calculated and stored can be changed dynamically based upon receiving a request as further discussed below. To illustrate, if John Doe has a personal value of 700 and Jane Doe has a personal value of 750, and a request is received by the present method to identify those individuals with personal values of 700 or greater for a political function for a Republican candidate, then the present method may not automatically deem both John Doe and Jane Doe to be appropriate matches for the request. For example, if John Doe is a registered Democrat, then this one piece of data may be heavily weighted in the context of the purpose of the request. In other words, knowing the purpose of a particular request may dynamically alter the previously calculated personal value. For example, a negative weight may be assigned to this one attribute such that John Doe's personal value for the purpose of this one particular request may actually fall significantly to 350, thereby falling well short of the requested personal value of 700 or greater as defined by the request. This dynamic approach in recalculating or adjusting the personal value in view of the nature of the request will provide greater accuracy in terms of the responses that will be provided to the various different requests. Thus, in one embodiment, the personal value will not only dynamically change based on the collected data, but it may also change based on the intent of a particular request.

In addition, a personal value attribute may actually change due to external events. For example, as more and more COBOL programmers retire, the personal value of a working COBOL programmer may dynamically increase due to scarcity of the resource. In other words, the value of each attribute or dimension that is used to compute the personal value may dynamically change based on external events.

Returning to FIG. 2, once the personal values have been calculated for a plurality of individuals, the stored personal values can be used for responding to targeted requests or inquires. For example, a third party vendor may want to market a particular product or service only to a particular group of individuals based on the individuals' personal value. For example, a country club may want to offer a free round of golf to potential customers who may eventually become members of the country club. However, the owner of the country club may not have the necessary resources to properly identify which individuals should be targeted for this particular promotion, especially when the promotion has a very high value. Although an individual who has a high income may be a potential target, using such isolated piece of financial information does not readily produce the desired result. Similarly, using a list of friends of current members of the country club by itself may also produce spotty results given that there is no information pertaining to the golf interests and financial capabilities of these friends of the current members.

To illustrate, if the personal value as discussed in the present disclosure contains one or more attributes that track sports interests of the users and their memberships to various clubs, e.g., country clubs, then individuals who have a high personal value who are also connected to other individuals who are current members of this particular country club, can be identified for receiving this very valuable promotion. The reason is that these particular individuals may be enticed to become members once they had an opportunity to play a round of free golf at this country club given that they already know people who are members.

Furthermore, in one embodiment, the request may actually originate from a user who has a calculated personal value. For example, the user may inquire as to a local restaurant that has been frequented by others with the same personal value as the requesting user.

Thus, in step 240, the method 200 receives a request or inquiry that can be serviced by using one or more of the plurality of stored personal values of various individuals. The request can be generic, e.g., how many individuals within a particular location have a personal value of 700 or greater. The request can be very specific, e.g., how many individuals within a particular location have a personal value of 700 or greater, who previously attended a particular university, and are currently employed as engineers.

In step 250, method 200 determines whether the access of the user's personal value is permitted. For example, the user may have specified via a user profile as to what situations or scenarios the user's personal value is to be accessed and used in response to a request or inquiry. For example, the user may specify that his or her personal value can be accessed by any third party as long as no specific personal information is provided in the response, e.g., the personal value is only used in an aggregate response, e.g., the user is one of 1000 users that meet the requirement of an inquiry without specifically identifying the user. Alternatively, the user may specify that his or her personal value cannot be accessed by any third party, but can only be used to assist a request issued by the user himself. In yet another alternative, the user may specify that his or her personal value can only be accessed by a particular third party, e.g., a university's placement office (or a head hunter firm) that is attempting to match a potential employer with an individual, e.g., a student, a particular professional, and so on.

In one embodiment, method 200 may actively solicit permission from the user (broadly user input). For example, if a request is received that will involve a particular user based on the user's personal value, the method may contact the user to ask if the user is willing to allow the system to divulge information pertaining to the user. For example, the method may detect that the user has been matched to a promotion offered by a third party based on the user's personal value. However, before the method is allowed to provide any of the user's information, the user must first be willing to receive the promotion. This safeguard allows the user to determine whether a particular promotion is worthy of providing the user's personal information to the third party vendor.

In one embodiment, the user's participation in allowing his or her personal value to be accessed should be incentivized. For example, a request for personal value information may be accompanied by an incentive to the individual, i.e., a boost in one aspect of the user's personal value or exclusivity to an offer (e.g., a new product or a new service) and the like.

If the access is not permitted, the method 200 proceeds to step 265. If the access is permitted, then the method 200 proceeds to step 260 where a response is provided to the request based on the personal value of at least one user. It should be noted that the response may provide a portion of the personal information related to the at least one user to the requester, e.g., an email address of the user, a cell phone number of the user, a mailing address of the user, a PO box address of the user, and the like. Alternatively, the user's personal value is only used in an aggregate response where no personal information of any of the users is provided. In yet another embodiment, the response may simply be a numerical value, e.g., 99 users matched the requester's inquiry. In turn, the requester may simply provide the promotion material to the present method, e.g., to the core network service provider, such that the core network service provider will distribute the promotion to the 99 identified users. In this fashion, the requester has a level of confidence that the promotion is provided in a very targeted manner and the user's personal information is safeguarded and the user is the recipient of a valuable promotion. In one embodiment, the core network service provider may implement method 200 as a network service, e.g., where the user is accessed a charge for the service and/or the requester is accessed a charge for the service of reaching a very targeted audience. Method 200 ends in step 265.

It should be noted that although not specifically specified, one or more steps of the method 200 may include a storing, displaying and/or outputting step as required for a particular application. In other words, any data, records, fields, and/or intermediate results discussed in each of the respective methods can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step.

Figure 3:
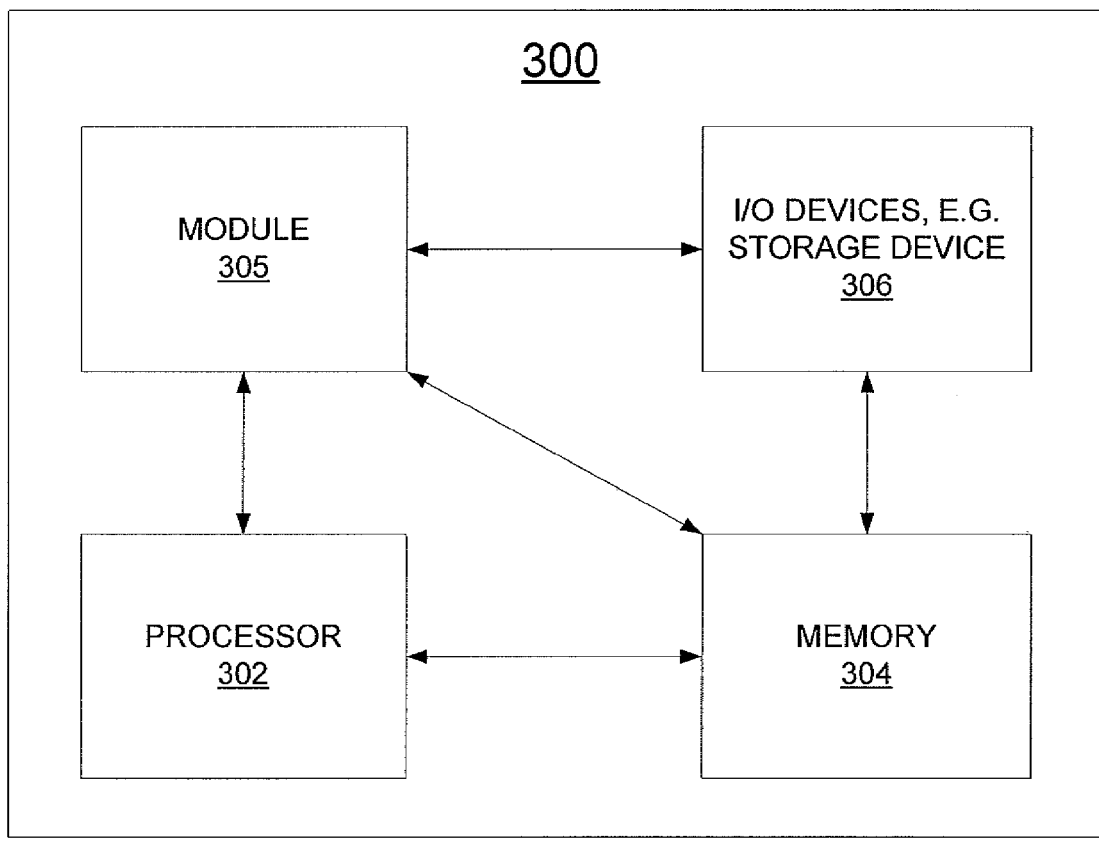
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a hardware processor element 302 (e.g., a CPU), a memory 304, e.g., random access memory (RAM) and/or read only memory (ROM), a module 305 for generating and utilizing a personal value for an individual as described herein, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)). In one embodiment, module 305 may comprise computer/processor executable code containing a plurality of instructions for performing steps of the exemplary method 200.

Accordingly, it should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. For example, in one embodiment, the module or process 305 can be loaded into memory 304 and executed by processor 302 to implement the functions as discussed above in connection with any one or more of the exemplary method 200. As such, the present module or process 305 (including associated data structures) of the present disclosure can be stored on a non-transitory (tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating a personal value for a user, comprising:
    collecting, by a processor, data associated with the user, wherein the data that is collected comprises social connection data and societal connection data, wherein the societal connection data comprises a number of societal groups that the user is associated with;
    enhancing, by the processor, the data that is collected, wherein the data that is collected comprises sensitive data, wherein the enhancing the data that is collected comprises:
        correlating the data to generate new data through inference;
        tracking an inheritance of the sensitive data by the new data; and
        desensitizing the new data, wherein the desensitizing the new data comprises enriching the new data with additional data that prevents the sensitive data from being inferred from the new data;
    generating, by the processor, the personal value for the user, wherein the personal value for the user is modified in response to the data that is collected and in response to the new data that is generated, wherein the personal value is modified based upon the number of societal groups that the user is associated with;
    receiving, by the processor, a request;
    determining, by the processor, in response to the request whether the personal value for the user is permitted to be accessed based upon a preference of the user; and
    generating, by the processor, a response to the request by using the personal value for the user when the personal value for the user is permitted to be accessed.

2. The method of claim 1, wherein the data that is collected further comprises self-identified data.

3. The method of claim 1, wherein the data that is collected further comprises self-generated data.

4. The method of claim 1, wherein the data that is collected further comprises financial data.

5. The method of claim 1, wherein the data that is collected further comprises consumer data.

6. The method of claim 1, wherein the data that is collected further comprises third party feedback data.

7. The method of claim 1, wherein the enhancing the data that is collected further comprises verifying the data with an independent source.

8. The method of claim 1, wherein the request is from a third party vendor and the personal value is generated in response to a parameter of the request.

9. The method of claim 8, wherein the response is generated in accordance with a user profile that allowed the personal value to be used.

10. The method of claim 8, wherein the response is generated in accordance with a user input that allowed the personal value to be used.

11. The method of claim 1, wherein the request is from the user.

12. A non-transitory computer-readable medium storing a plurality of instructions which, when executed by a processor, cause the processor to perform operations for generating a personal value for a user, the operations comprising:
    collecting data associated with the user, wherein the data that is collected comprises social connection data and societal connection data, wherein the societal connection data comprises a number of societal groups that the user is associated with;
    enhancing the data that is collected, wherein the data that is collected comprises sensitive data, wherein the enhancing the data that is collected comprises:
        correlating the data to generate new data through inference;
        tracking an inheritance of the sensitive data by the new data; and
        desensitizing the new data, wherein the desensitizing the new data comprises enriching the new data with additional data that prevents the sensitive data from being inferred from the new data;
    generating the personal value for the user, wherein the personal value for the user is modified in response to the data that is collected, wherein the personal value is modified based upon the number of societal groups that the user is associated with;
    receiving a request;
    determining in response to the request whether the personal value for the user is permitted to be accessed based upon a preference of the user; and
    generating a response to the request by using the personal value for the user when the personal value for the user is permitted to be accessed.

13. The non-transitory computer-readable medium of claim 12, wherein the data that is collected further comprises self-identified data, self-generated data, financial data, consumer data, and third party feedback data.

14. The non-transitory computer-readable medium of claim 12, wherein the enhancing the data that is collected further comprises verifying the data with an independent source.

15. An apparatus for generating a personal value for a user, comprising:
    a processor; and
    a computer-readable medium storing a plurality of instructions which, when executed by the processor, cause the processor to perform operations, the operations comprising:
        collecting data associated with the user, wherein the data that is collected comprises social connection data and societal connection data, wherein the societal connection data comprises a number of societal groups that the user is associated with;
        enhancing the data that is collected, wherein the data that is collected comprises sensitive data, wherein the enhancing the data that is collected comprises:
            correlating the data to generate new data through inference;
            tracking an inheritance of the sensitive data by the new data; and desensitizing the new data, wherein the desensitizing the new data comprises enriching the new data with additional data that prevents the sensitive data from being inferred from the new data;

generating the personal value for the user, wherein the personal value for the user is modified in response to the data that is collected, wherein the personal value is modified based upon the number of societal groups that the user is associated with;

receiving a request;

determining in response to the request whether the personal value for the user is permitted to be accessed based upon a preference of the user; and generating a response to the request by using the personal value for the user when the personal value for the user is permitted to be accessed.

* * * * *